US009762953B2

(12) United States Patent
Lee

(10) Patent No.: US 9,762,953 B2
(45) Date of Patent: Sep. 12, 2017

(54) TV AND OPERATING METHOD THEREFOR

(71) Applicant: LG ELECTRONICS INC., Seoul (KR)

(72) Inventor: Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/025,247

(22) PCT Filed: Aug. 7, 2014

(86) PCT No.: PCT/KR2014/007323
§ 371 (c)(1),
(2) Date: Mar. 25, 2016

(87) PCT Pub. No.: WO2015/046747
PCT Pub. Date: Apr. 2, 2015

(65) Prior Publication Data
US 2016/0227273 A1    Aug. 4, 2016

(30) Foreign Application Priority Data
Sep. 27, 2013    (KR) ........................ 10-2013-0115237

(51) Int. Cl.
*H04N 21/482*    (2011.01)
*H04N 21/45*    (2011.01)
(Continued)

(52) U.S. Cl.
CPC ........... *H04N 21/4384* (2013.01); *H04N 5/50* (2013.01); *H04N 21/2743* (2013.01);
(Continued)

(58) Field of Classification Search
CPC .. H04N 21/4622; H04N 21/4384; H04N 5/50; H04N 21/2743; H04N 21/4122
See application file for complete search history.

(56) References Cited

U.S. PATENT DOCUMENTS

| 2010/0138863 | A1 | 6/2010 | Diaz Perez | |
| 2011/0013089 | A1* | 1/2011 | Adolphson | .......... H04N 5/4401 348/723 |

(Continued)

FOREIGN PATENT DOCUMENTS

| EP | 2 357 806 A2 | 8/2011 | |
| FR | EP2357806 A2 * | 8/2011 | ......... H04N 5/44543 |
| WO | WO 2012/026750 A2 | 3/2012 | |

OTHER PUBLICATIONS

International Search Report (with English translation) and Written Opinion dated Dec. 2, 2014 issued in Application No. PCT/KR2014/007323.

*Primary Examiner* — Sumaiya A Chowdhury
(74) *Attorney, Agent, or Firm* — KED & Associates, LLP

(57) ABSTRACT

Provided is an operating method of a TV for allocating a dynamic channel for content transmitted from an outside. The method includes: receiving a first content from the outside; generating a dynamic channel for the first content; displaying a channel change guide according to the first content reception; entering the dynamic channel according to a first channel change input; displaying a playback screen of the first content according to the dynamic channel entry; and exiting from the dynamic channel according to a second channel change input, wherein the dynamic channel is formed of a channel that is the closest to a recent broadcast channel.

25 Claims, 12 Drawing Sheets

(51) Int. Cl.

| | |
|---|---|
| *H04N 5/44* | (2011.01) |
| *H04N 21/438* | (2011.01) |
| *H04N 5/50* | (2006.01) |
| *H04N 21/414* | (2011.01) |
| *H04N 21/422* | (2011.01) |
| *H04N 21/431* | (2011.01) |
| *H04N 21/434* | (2011.01) |
| *H04N 21/458* | (2011.01) |
| *H04N 21/462* | (2011.01) |
| *H04N 21/4788* | (2011.01) |
| *H04N 21/858* | (2011.01) |
| *H04N 21/2743* | (2011.01) |
| *H04N 21/41* | (2011.01) |

(52) U.S. Cl.
CPC ... *H04N 21/4122* (2013.01); *H04N 21/41407* (2013.01); *H04N 21/4222* (2013.01); *H04N 21/4316* (2013.01); *H04N 21/4341* (2013.01); *H04N 21/4382* (2013.01); *H04N 21/4383* (2013.01); *H04N 21/4586* (2013.01); *H04N 21/4622* (2013.01); *H04N 21/4788* (2013.01); *H04N 21/482* (2013.01); *H04N 21/4821* (2013.01); *H04N 21/8586* (2013.01); *H04N 21/45* (2013.01); *H04N 2005/4428* (2013.01)

(56) References Cited

U.S. PATENT DOCUMENTS

| | | |
|---|---|---|
| 2011/0023065 A1 | 1/2011 | Edlund et al. |
| 2011/0205435 A1 | 8/2011 | Lee et al. |
| 2013/0125018 A1 | 5/2013 | Park et al. |

\* cited by examiner

FIG. 6
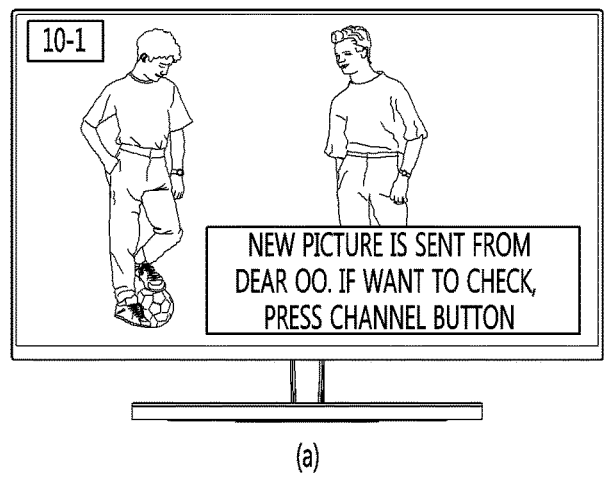
(a)
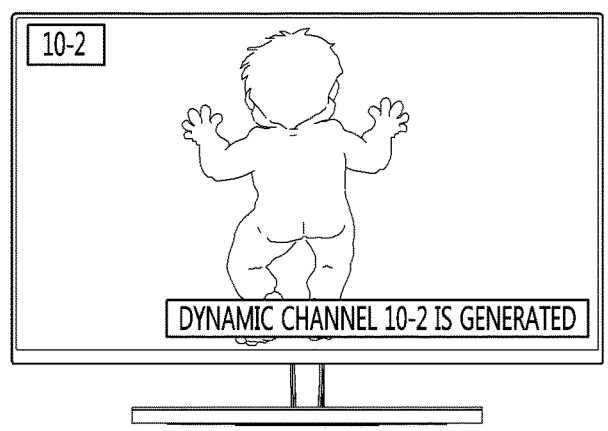
(b)
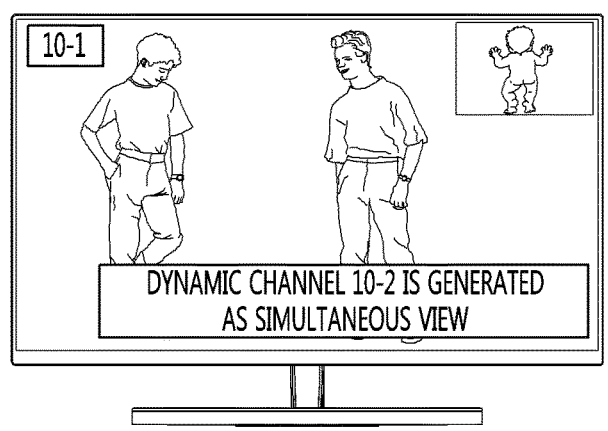
(c)

FIG. 9
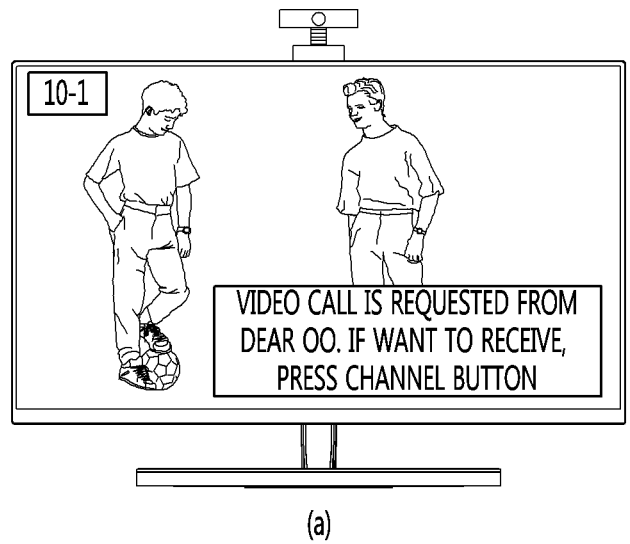
(a)
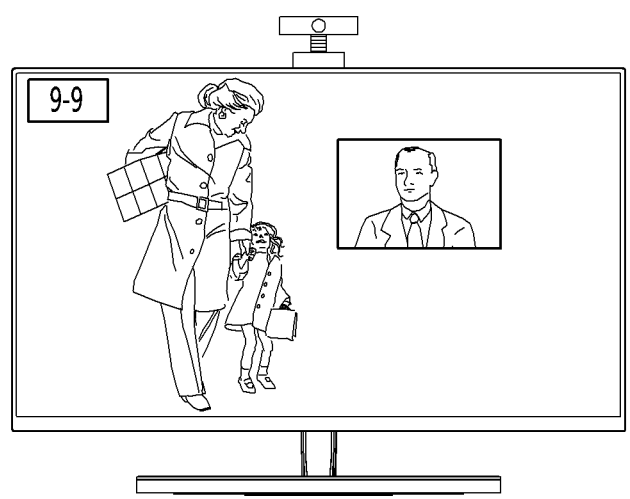
(b)

|  | 2013-05-05 | 2013-05-08 | 2013-05-15 | 2013-07-25 | 2013-08-08 | 2013-08-14 |
|---|---|---|---|---|---|---|
| 9-9(VIDEO CALL) |  | GENERATE CHANNEL (~2013-12-31) | VIEW CHANNEL |  | VIEW CHANNEL |  |
| 10-1(App) |  |  | GENERATE CHANNEL (~2013-10-10) |  |  | APP UPDATE |
|  |  |  | VIEW CHANNEL |  |  |  |
| 11-2(PICTURE) ● | GENERATE CHANNEL (INDEFINITELY) |  |  | UPDATE ● |  |  |

TV AND OPERATING METHOD THEREFOR

CROSS-REFERENCE TO RELATED PATENT APPLICATIONS

This application is a U.S. National Stage Application under 35 U.S.C. §371 of PCT Application No. PCT/KR2014/007323, filed Aug. 7, 2014, which claims priority to Korean Patent Application No. 10-2013-0115237, filed Sep. 27, 2013, whose entire disclosures are hereby incorporated by reference.

TECHNICAL FIELD

The present disclosure relates to a TV and a method of operating the same, and more particularly, to a TV for providing a dynamic channel to access sharing contents and a method of operating the same.

BACKGROUND ART

Recently, digital TV services using wired or wireless communication networks are becoming common. The digital TV services may provide various services that conventional analog broadcasting services cannot provide.

Especially, as Internet Protocol Televisions (IPTVs) or Smart TVs share contents such as images with user terminals such as Smart Phones and display them recently, the convenience of being able to display high-quality contents captured by mobile terminals to users through a larger screen has been provided.

Moreover, due to the characteristics of TVs used by users of various age groups, it is necessary to develop a technology that can access shared contents with a simple manipulation.

DISCLOSURE OF THE INVENTION

Technical Problem

Embodiments provide a TV for accessing sharing contents by using a dynamic channel and a method of operating the same.

Technical Solution

In one embodiment, provided is an operating method of a TV for allocating a dynamic channel for content transmitted from an outside. The method includes: receiving a first content from the outside; generating a dynamic channel for the first content; displaying a channel change guide according to the first content reception; entering the dynamic channel according to a first channel change input; displaying a playback screen of the first content according to the dynamic channel entry; and exiting from the dynamic channel according to a second channel change input, wherein the dynamic channel is formed of a channel that is the closest to a recent broadcast channel.

In another embodiment, provided is an operating method of a TV for allocating a dynamic channel for content transmitted from a server. The method includes: receiving a notification message for notifying that a first content is uploaded to the server; generating a dynamic channel for the first content; receiving the first content from the server; displaying a channel change guide according to the first content reception; entering the dynamic channel according to a first channel change input; displaying a playback screen of the first content according to the dynamic channel entry; exiting from the dynamic channel according to a second channel change input; receiving a notification message for notifying that a second content is uploaded to the server; when a property of the second content is identical to a property of the first content, determining the dynamic channel as a dynamic channel for the second content; receiving the second content from the server; displaying a channel change guide according to the second content reception; entering the dynamic channel according to a third channel change input; and displaying a playback screen of the second content according to the dynamic channel entry.

In further another embodiment, provided is a TV for allocating a dynamic channel for content transmitted from an outside. The TV includes: an audio output unit; a display unit; a user interface unit configured to receive a user input for channel change; a tuner configured to receive a broadcast signal corresponding to a broadcast channel selected according to a user input; a demodulation unit configured to demodulate a broadcast signal received through the tuner and decode the broadcast channel to output a stream signal; a network interface unit configured to receive a first content from the outside; and a control unit configured to demultiplex the stream signal into an audio signal and a video signal, signal-process the audio signal and then output the processed audio signal through the audio output unit, process the video signal and then output the processed video signal through the display unit, generate a dynamic channel for the first content, control the display unit to display a playback screen of the first content by changing the broadcast channel into the dynamic channel according to a first channel change input, and control the display unit to display a playback screen of a broadcast program corresponding to a broadcast channel changed from the dynamic channel according to a second channel change input, wherein the control unit forms a channel that is closest to the broadcast channel as the dynamic channel.

Advantageous Effects

A TV according to an embodiment of the present invention provides a dynamic channel to improve the convenience for accessing user's sharing content.

BRIEF DESCRIPTION OF THE DRAWINGS

FIG. 6 is a view illustrating screens when a dynamic channel of a TV is generated, entered, or exited according to an embodiment of the present invention.

FIG. 9 is a view illustrating screens when a dynamic channel for a video call of a TV is generated or entered according to an embodiment of the present invention.

MODE FOR CARRYING OUT THE INVENTION

Hereinafter, a TV and an operating method thereof according to an embodiment of the present invention are described in detail with reference to the accompanying drawings.

A TV according to an embodiment of the present invention, for example, as an artificial TV that adds a computer supporting function to a broadcast receiving function, may have an easy-to-use interface such as a writing-type input device, a touch screen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS may b used.

Accordingly, since various applications are freely added or deleted on a general purpose OS kernel, a TV described in this present invention, for example, may perform various user-friendly functions. The TV, in more detail, may be a network TV, an HBBTV, a smart TV, an LED TV, an OLED TV, and so on and in some cases, may be applied to a smartphone.

Furthermore, although embodiments of the present invention are described in detail with reference to the accompanying drawings and contents in the accompanying drawings, the present invention is not limited or restricted by the embodiments.

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

Figure 1:
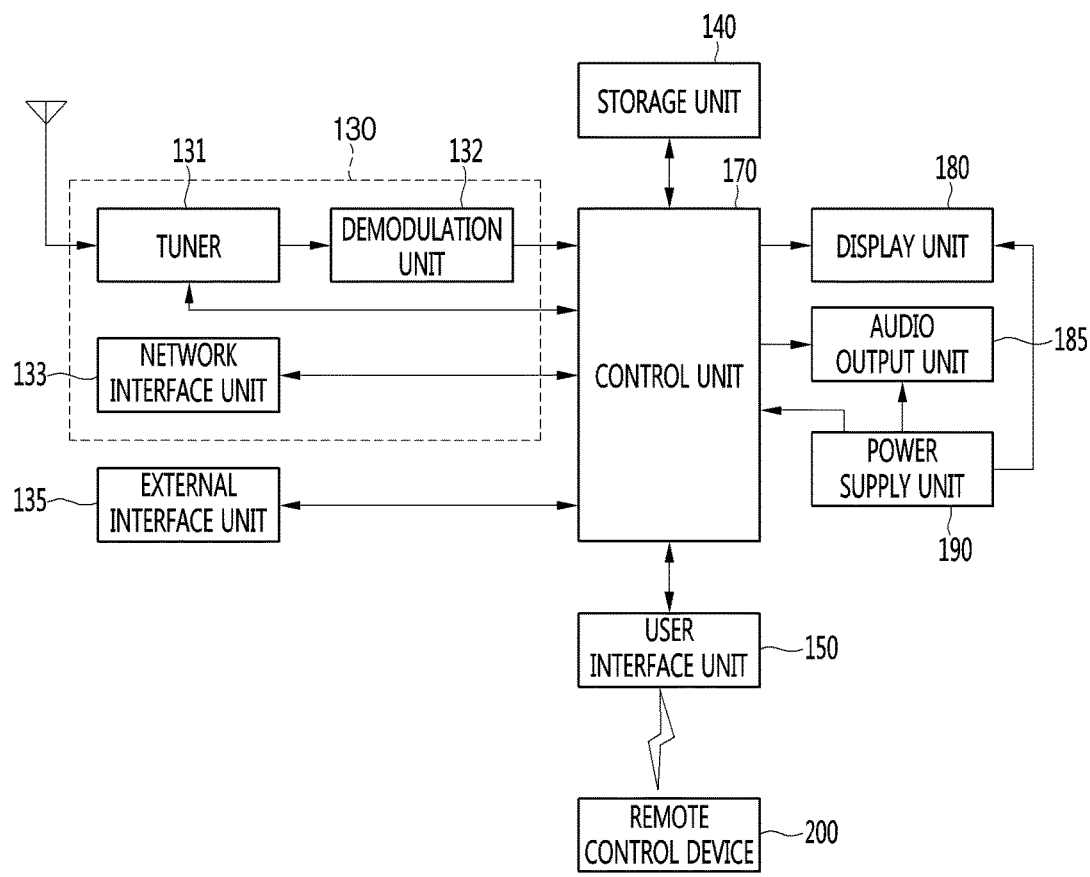
FIG. 1 is a block diagram illustrating a configuration of a TV according to an embodiment of the present invention.

FIG. 1 is a block diagram illustrating a configuration of a TV according to an embodiment of the present invention.

Referring to FIG. 1, a TV 100 may include a broadcast reception unit 130, an external device interface unit 135, a storage unit 140, a user input interface unit 150, a control unit 170, a display unit 180, an audio output unit 185, and a power supply unit 190. Moreover, the broadcast reception unit 130 may include a tuner 131, a demodulation unit 132, and a network interface unit 133.

The tuner 131 may select a Radio Frequency (RF) broadcast signal corresponding to a channel selected by a user or pre-stored all channels among RF signals received through an antenna and convert the selected RF broadcast signal into an intermediate frequency signal, a base band image, or a voice signal.

For example, when the selected RF broadcast signal is a digital broadcast signal, the tuner 131 may convert the signal into a digital IF signal DIF and when the selected RF broadcast signal is an analog broadcast signal, convert the signal into an analog base band image or a voice signal CVBS/SIF.

That is, the tuner 131 may process both a digital broadcast signal and an analog broadcast signal and an analog base band image or a voice signal CVBS/SIF outputted from the tuner 131 may be directly inputted to the control unit 170.

Additionally, the tuner 131 may receive an RF broadcast signal of a single carrier according to an Advanced Television System Committee (ATSC) method or an RF broadcast signal of a plurality of carriers according to a Digital Video Broadcasting (DVB) method.

Moreover, the tuner 131 may sequentially select RF broadcast signals of all broadcast channels stored through a channel memory function among RF broadcast signals received through an antenna and convert them into an intermediate frequency signal, a base band image, or a voice signal.

The demodulation unit 132 may receive the converted digital IF signal DIF from the tuner 131 and perform a demodulation operation. For example, when the digital IF signal outputted from the tuner 131 is the ATSC method, the demodulation unit 132 may perform 8-Vestigal Side Band (8-VSB) demodulation.

Additionally, the demodulation unit 132 may perform channel decoding and for this, may include a Trellis Decoder, a De-interleaver, and a Reed Solomon Decoder to perform Trellis decoding, De-interleaving, and Reed Solomon decoding.

For example, when the digital IF signal outputted from the tuner 131 is the DVB method, the demodulation unit 132 may perform Coded Orthogonal Frequency Division Modulation (COFDMA) demodulation.

Additionally, the demodulation unit 132 may perform channel decoding and for this, may include a convolution decoder, a De-interleaver, and a Reed Solomon Decoder to perform convolution decoding, De-interleaving, and Reed Solomon decoding.

After performing demodulation and channel decoding, the demodulation unit 132 may output a stream signal TS and the stream signal may be a signal obtained by de-multiplexing an image signal, a voice signal, or a data signal.

For example, the stream signal may be MPEG-2 Transport Stream (TS) where an MPEG2 standard image signal and a Dolby AC-3 standard voice signal are multiplexed. In more detail, MPEG-2 TS may include a 4-byte header and a 184-byte payload.

The header contains information for notifying the start of a signal and a Packet Identifier (PID) for a signal in a payload and the payload contains image, audio, and channel specific EPG information. The EPG information may include a System Time Table (STT) by Program and System Information Protocol (PSIP), a Master Guide Table (MGT), a Virtual Channel Table (VCT), a Rating Region Table (RRT), and an Event Information Table (EIT).

Moreover, the demodulation unit 132 may include an ATSC demodulation unit and a DVB demodulation unit separately according to the ATSC method and the DVB method.

A stream signal outputted from the demodulation unit 132 may be inputted into the control unit 170 and the control unit 170 may output an image to the display unit 180 and output voice to the audio output unit 185 after performing de-multiplexing and image/voice signal processing.

The external interface unit 135 may connect an external device and the TV 100 and for this, may include an A/V input/output unit (not shown) or a wireless communication unit (not shown).

The external device interface unit 135 may access an external device such as Digital Versatile Disk (DVD), Blu ray, a game console, a camera, a camcorder, a computer (notebook), and so on through wired/wireless communication.

Additionally, the external device interface unit 135 may deliver image, voice or data signals to the control unit 170 of the TV 100 through a connected external device and output image, voice or data signals processed by the control unit 170 to a connected external device.

An A/V input/output unit (not shown) may include a USB terminal, a Composite Video Banking Sync (CVBS) terminal, a component terminal, an S-video terminal (analog), a Digital Visual Interface (DVI) terminal, a High Definition Multimedia Interface (HDMI) terminal, an RGB terminal, and a D-SUB terminal in order to input image and voice signals of an external device to the TV 100.

Moreover, a wireless communication unit (not shown) may perform short-range wireless communication with another electronic device. For example, the TV 100 may be network-connected to another electronic device according to communication standards such as Bluetooth, Radio Frequency Identification (RFID), infrared Data Association (IrDA), Ultra Wideband (UWB), ZigBee, and Digital Living Network Alliance (DLNA).

Additionally, the external device interface unit 135 is connected to various set-top boxes through at least one of the above-mentioned various terminals to perform an input/output operation with a set-top box.

Moreover, the external device interface unit 135 may receive an application or an application list in an adjacent external device and deliver it to the control unit 170 or the storage unit 140.

The network interface unit 133 may provide an interface for connecting the TV 100 to a wired/wireless network including internet network. For example, the network interface unit 133 may include an Ethernet terminal to access a wired network and access a wireless network by using Wireless LAN (WLAN) (for example, Wi-Fi), Wireless broadband (Wibro), World Interoperability for Microwave Access (Wimax), or High Speed Downlink Packet Access (HSDPA) communication standard.

Moreover, the network interface unit 133 may transmit or receive data to or from another user or another electronic device through an accessed network or another network linked to the accessed network.

Additionally, content data stored in the TV 100 may be transmitted to a selected user or electronic device among other users or other electronic devices pre-registered in the TV 100.

The network interface unit 133 may access a predetermined webpage through an accessed network or another network linked to the accessed network. That is, it may transmit or receive data to or from a corresponding server by accessing a predetermined webpage through network.

Then, the network interface unit 133 may receive contents or data provided from a content provider or a network operator. That is, the network interface unit 133 may receive contents such as movies, advertisements, games, VODs, and broadcast signals, which are provided from a content provider or a network provider, through network and information relating thereto.

Additionally, the network interface unit 133 may receive firmware update information and update files provided from a network operator and transmit data to an internet or content provider or a network operator.

The network interface unit 133 may select and receive a desired application among applications open to the air, through network.

The storage unit 140 may store a program for each signal processing and control in the control unit 170 and store signal-processed image, voice, or data signals.

Additionally, the storage unit 140 may perform a function for temporarily storing image, voice, or data signals outputted from the external device interface unit 135 or the network interface unit 133 and store information on a predetermined broadcast channel through a channel memory function.

The storage unit 140 may store an application or an application list inputted from the external device interface unit 135 or the network interface unit 133.

The storage unit 140, for example, may include at least one type of storage medium among a flash memory type, a hard disk type, a multimedia card micro type, card type, a card type memory (for example, SD or XD memory), RAM, and ROM (for example, EEPROM).

The TV 100 may play content files (for example, video files, still image files, music files, document files, application files, and so on) stored in the storage unit 140 and provide them to a user.

The user interface unit 150 may deliver signals inputted from a user to the control unit 170 or deliver signals from the control unit 170 to a user. For example, the user interface unit 150 may receive or process control signals such as power on/off, channel selection, and screen setting from the remote control device 200 or transmit control signals from the control unit 170 to the remote control device 200 according to various communication methods such as a Radio Frequency (RF) communication method or an IR communication method.

Additionally, the user interface unit 150 may deliver, to the control unit 170, control signals inputted from local keys (not shown) such as a power key, a channel key, and a setting key.

Moreover, the user interface unit 150 may deliver control signals inputted from a sensing unit (not shown) for sensing a user's gesture to the control unit 170 or transmit signals from the control unit 170 to the sensing unit (not shown). Moreover, the sensing unit (not shown) may include a touch sensor, a voice sensor, a position sensor, and a motion sensor.

The control unit 170 may de-multiplex a stream inputted from the tuner 131, the demodulation unit 132, or the external device interface unit 135 or process de-multiplexed signals to generate and output signals for image or voice output.

Image signals that are image-processed in the control unit 170 may be inputted to the display unit 180 and displayed as an image corresponding to corresponding image signals. Additionally, image signals that are image-processed in the control unit 170 may be inputted to an external output device through the external device interface unit 135.

Voice signals that are processed in the control unit 170 may be audio-outputted to the audio output unit 185. Additionally, voice signals processed in the control unit 170 may be inputted to an external output device through the external device interface unit 135.

Besides that, the control module 170 may control overall operations in the TV 100. For example, the control unit 170 may control the tuner 131 to be tuned to an RF broadcast corresponding to a channel selected by a user or a pre-stored channel.

Additionally, the control unit 170 may control the TV 100 by a user command inputted through the user input interface unit 150 or an internal program and download a desired application or an application list into the TV 100 by accessing network.

For example, the control unit 170 may control the tuner 131 to allow signals of a selected channel to be inputted according to a predetermined channel selection command received through the user interface unit 150 and process image, voice or data signals of a selected channel.

The control unit 170 may output channel information selected by a user together with processed image or voice signals through the display unit 180 or the audio output unit 185.

Additionally, according to an external device image playback command received through the user interface unit 150, the control unit 170 may output image signals or voice signals of an external device, for example, a camera or a camcorder, which are inputted through the external device interface unit 135, through the display unit 180 or the audio output unit 185.

Moreover, the control unit 170 may control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 may be a still image or video and also may be a 2D image or a 3D image.

Additionally, the control unit 170 may play content stored in the TV 100, received broadcast content, and external input content inputted from the outside, and the content may be in various formats such as broadcast images, external input images, audio files, still images, accessed web screens, and document files.

Moreover, although not shown in FIG. 1, the TV 100 may further include a channel browsing processing unit for generating a thumbnail image corresponding to a channel signal or an external input signal.

The channel browsing processing unit may receive a stream signal TS outputted from the demodulation unit 132 or a stream signal outputted from the external device interface unit 135 and extract an image from the inputted stream signal to generate a thumbnail image.

The generated thumbnail image may be inputted to the control unit 170 as it is or after decoding or may be encoded in a stream form and inputted to the control unit 170.

The control unit 170 may display a thumbnail list including a plurality of thumbnail images on the display unit 180 by using an inputted thumbnail image and thumbnail images in a thumbnail list may be updated sequentially or at the same time. Correspondingly, a user may easily understand the contents of a plurality of broadcast channels.

The display unit 180 may convert image signals, data signals, or OSD signals, which are processed in the control unit 170, or images signals or data signals, which are received in the external device interface unit 135, into R, G, and B signals to generate driving signals.

For this, the display unit 180 may use a PDP, an LCD, an OLED, a flexible display, and a 3D display or may be configured with a touch screen and used as an input device in addition to an output device.

The audio output unit 185 may receive signals that are voice-processed in the control unit 170, for example, stereo signals, 3.1 channel signals, or 5.1 channel signals, to be outputted as voice and for this, various forms of speakers may be used.

Moreover, the TV 100 may further include a capturing unit (not shown) for obtaining a user's image and image information obtained by the capturing unit (not shown) may be inputted to the control unit 170.

In this case, the control unit 170 may detect a user's gesture by using an image captured from a capturing unit (not shown) and a signal detected from a sensing unit (not shown) separately or in combination.

The power supply unit 190 may supply corresponding power to the TV 100 and for example, may supply power to the control unit 170 implemented in the form of a System On Chip (SOC), the display unit 180, and the audio output unit 185.

For this, the power supply unit 190 may include a converter (not shown) for converting AC power into DC power and when the display unit 180 is implemented as a liquid crystal panel including a plurality of backlight lamps, it may further include a PWM operation available inverter (not shown) in order for variable brightness or dimming drive.

The remote control device 200 transmits a user input to the user interface unit 150. For this, the remote control device 200 may use Bluetooth, Radio Frequency (RF) communication, IR communication, Ultra Wideband (UWB), and a ZigBee method.

Additionally, the remote control device 200 may receive image, voice or data signals outputted from the user interface unit 150 and then, display them or output voice or vibration.

The TV 100 may be a digital broadcast receiver for receiving at least one of ATSC method (8-VSB method) digital broadcast, DVB-T method (COFDM method) digital broadcast, and ISDB-T method (BST-OFDM method) digital broadcast.

Furthermore, the TV 100 shown in FIG. 1 is just one embodiment of the present invention and thus, some of the components shown may be integrated, added, or omitted according to the specification of the actually implemented TV 100.

That is, if necessary, two or more components may be integrated into one component or one component may be divided into two or more components and configured. Additionally, a function performed by each block is to describe an embodiment of the present invention and its specific operation or device does not limit the scope of the present invention.

According to another embodiment of the present invention, unlike FIG. 1, the TV 100 may receive images through the network interface unit 133 or the external device interface unit 135 and play them without including the tuner 131 and the demodulation unit 132.

For example, the TV 100 may be divided into an image processing device such as a set-top box for receiving broadcast signals or contents according to various network services and a content playback device for playing contents inputted from the image processing device.

In this case, a method of providing content or setting appropriate for a plurality of users according to an embodiment of the present invention described below may be performed by one of an image processing device such as the separated set-top box, and a content playback device including the display unit 180 and the audio output unit 185 in addition to the TV 100 described with reference to FIG. 1.

Figure 2:
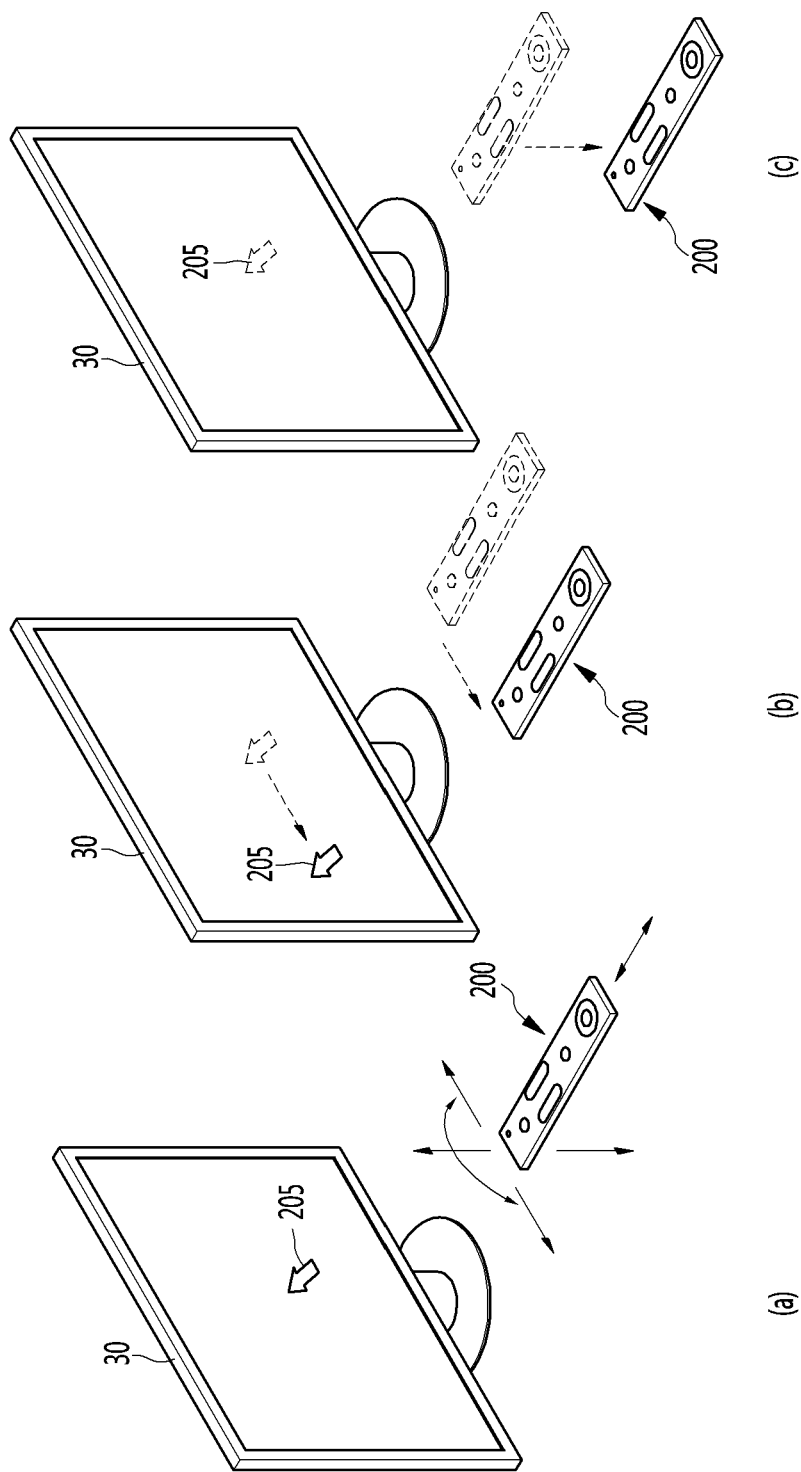
FIG. 2 is a view illustrating a method of controlling an operation of a TV by using a remote control device according to an embodiment of the present invention.

FIG. 2 is a view illustrating a method of controlling an operation of a TV by using a remote control device according to an embodiment of the present invention.

As shown in (a) of FIG. 2, a pointer 205 corresponding to the remote control device 200 is displayed on the display unit 180.

A user may move or rotate the remote control device 200 vertically or horizontally. The pointer 205 displayed on the display unit 180 of the TV 100 corresponds to a movement of the remote control device 200. Since the corresponding pointer 205 is moved and displayed according to a movement on a 3D space as show in the drawing, the remote control device 200 may be referred to as a spatial remote controller.

(b) of FIG. 2 illustrates that when a user moves the remote control device 200, the pointer 205 displayed on the display unit 180 of the TV 100 is moved to the left in correspondence thereto.

Information on a movement of the remote control device 200 detected through a sensor of the remote control device 200 is transmitted to the TV 100. The TV 100 may calculate the coordinates of the pointer 205 from the information on the movement of the remote control device 200. The TV 100 may display the pointer 205 to match the calculated coordinates.

(c) of FIG. 2 illustrates that while a specific button in the remote control device 200 is pressed, a user moves the remote control device 200 away from the display unit 180. Thus, a selection area in the display unit 180 corresponding to the pointer 205 may be zoomed in and displayed largely.

On the other hand, when a user moves the remote control device 200 close to the display unit 180, a selection area in the display unit 180 corresponding to the pointer 205 may be zoomed out and displayed reduced.

On the other hand, when the remote control device 200 is away from the display unit 180, a selection area may be zoomed out and when the remote control device 200 is close to the display unit 180, a selection area may be zoomed in.

Additionally, when a specific button in the remote control device 200 is pressed, the recognition of a vertical or horizontal movement may be excluded. That is, when the remote control device 200 is moved away from or close to the display unit 180, the up, down, left, or right movement may not be recognized and only the back and fourth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, the pointer 205 in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Hereinafter, referring to FIGS. 3 and 4, the dynamic channel generation of a TV is described in detail according to an embodiment of the present invention.

Figure 3:
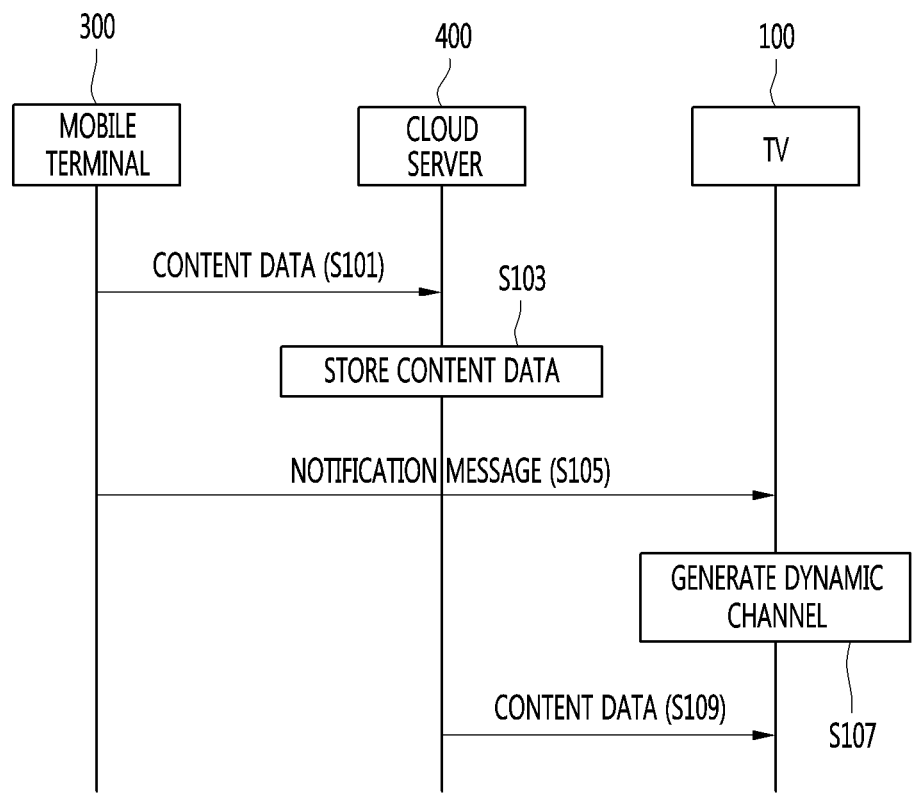
FIG. 3 is a flowchart illustrating a method of generating a dynamic channel of a TV according to an embodiment of the present invention.

FIG. 3 is a flowchart illustrating a method of generating a dynamic channel of a TV according to an embodiment of the present invention.

A plurality of devices such as the mobile terminal 300 and the TV 100 of FIG. 3 may share various contents through a cloud server 400.

Referring to FIG. 3, the mobile terminal 300 may upload content data to the cloud server 400 in operation S101.

The cloud server 400 may include a plurality of storage areas and upload contents to a desired storage area among the plurality of storage areas included in the cloud server 400.

Content data may include at least one of image data and voice data and also may include URL information but is not limited thereto.

The mobile terminal 300 may transmit/receive content data to/from the cloud server 400 through a wireless data network such as WiFi, WiBro, and WiMax. The TV 100 may receive content data from the cloud server 400 through internet or IPTV network.

At this point, the mobile terminal 300 may transmit content related information together with content data to the cloud server 400.

The content related information may include sharing device information, playback period information, and notification message for corresponding content.

The sharing device information may include identification information of a device that shares corresponding contents. For example, the sharing device information may be the Internet Protocol (IP) Address or Media Access Control (MAC) Address of the TV 100. A user may limit a device that accesses the content uploaded to the cloud server 400 by inputting sharing device information. The sharing device information input may be an IP address input or a MAC address input, and also may be a selection input on one TV among a plurality of TVs detected within a predetermined area, but is not limited thereto.

The playback period information may means a period in which corresponding content is shared. For example, the playback period information may be a dynamic channel holding time described later. The playback period information may include information on a content playback time and a content playback count.

A notification message may mean a message for notifying that corresponding content is uploaded to the cloud server 400. According to a user selection, the notification message may be or may not be transmitted to the TV 100. The notification message may be directly transmitted from the mobile terminal 300 to the TV 100 or from the cloud server 400 to a TV but is not limited thereto.

Then, the cloud server 400 stores the uploaded content data in operation S103.

At this point, the cloud server 400 may store content data uploaded to a storage area that the mobile terminal 300 wants among a plurality of storage areas but is not limited thereto.

Moreover, the mobile terminal 300 uploads content data to the cloud server 400 and transmits a notification message to the TV 100 in operation S105.

The notification message may include URL of the cloud server 400.

The notification message, as described above, may be transmitted from the cloud server 400 in addition to the mobile terminal 300.

Then, the TV 100 that receives the notification message generates a dynamic channel in operation S107.

That is, the notification message may be a dynamic channel generation command. The TV 100 may generate a dynamic channel according to the notification message reception regardless of a power state.

Furthermore, the dynamic channel may be formed of a channel that is the closest to a recent channel.

For example, when the power of the TV 100 is in ON state, the dynamic channel may be formed of a channel that is the closest to a broadcast channel in display currently.

Alternatively, when the power of the TV 100 is in OFF state, the dynamic channel may be formed of a channel that is the closest to a broadcast channel displayed at a power off time point.

Alternatively, when the TV 100 outputs a signal inputted from the current outside, the dynamic channel may be formed of a channel that is the closest to the current channel according to external EPG information.

In such a way, the dynamic channel is determined according to a recent channel.

As a dynamic channel is generated in the TV 100, the cloud server 400 transmits uploaded content data to the TV 100 in operation S109.

Hereinafter, descriptions for the same parts described above are omitted or simplified.

Figure 4:
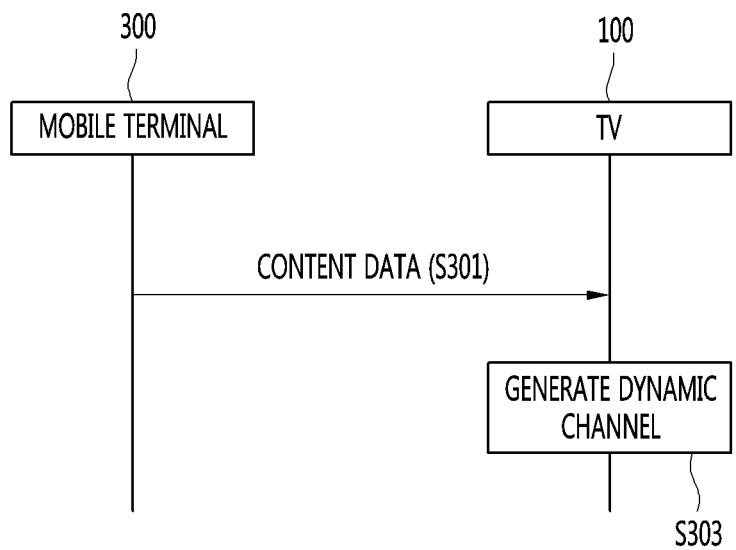
FIG. 4 is a flowchart illustrating a method of generating a dynamic channel of a TV according to an embodiment of the present invention.

FIG. 4 is a flowchart illustrating a method of generating a dynamic channel of a TV according to an embodiment of the present invention.

Referring to FIG. 4, when the mobile terminal 300 transmits content data to the TV 100 in operation S301, the TV 100 generates a dynamic channel in operation S303. At this point, the content data may be a dynamic channel generation command.

Moreover, the mobile terminal 300 may transmit content related information together with content data to the TV 100.

As described with reference to FIGS. 3 and 4, in addition to a dynamic channel for content data transmitted from the outside, although not shown in the drawings, a channel provided from the inside of the TV 100 or a dynamic channel for Smart function may be generated.

According to an embodiment of the present invention, when a channel or a Smart function provided from the TV 100 satisfies a predetermined condition, a dynamic channel generation message may be displayed on the display unit 180.

The predetermined condition may include an execution frequency or whether or not to perform repetitive execution. For example, when a specific Smart function is executed more than a predetermined number of times or is executed more than a predetermined number of times for a predetermined period, or a pattern is formed and executed repeatedly, the TV 100 may display a dynamic channel generation message on the display unit 180.

At this point, after displaying the dynamic channel generation message, if a predetermined time elapses or a user input for selecting the dynamic channel generation of a corresponding Smart function is received, the TV 100 may generate a dynamic channel for a corresponding Smart function.

According to another embodiment of the present invention, when the TV 100 accesses a webpage through network, a user input for specifying the accessed webpage as a Bookmaker may be a dynamic channel generation command.

Hereinafter, referring to FIGS. 5 to 9, the dynamic channel entry and exit of a TV are described in detail according to an embodiment of the present invention. The dynamic channel entry and exit of the TV 100 described below may be applied to a case that the TV 100 shares content data uploaded by the mobile terminal 300 through the cloud server 400.

Figure 5:
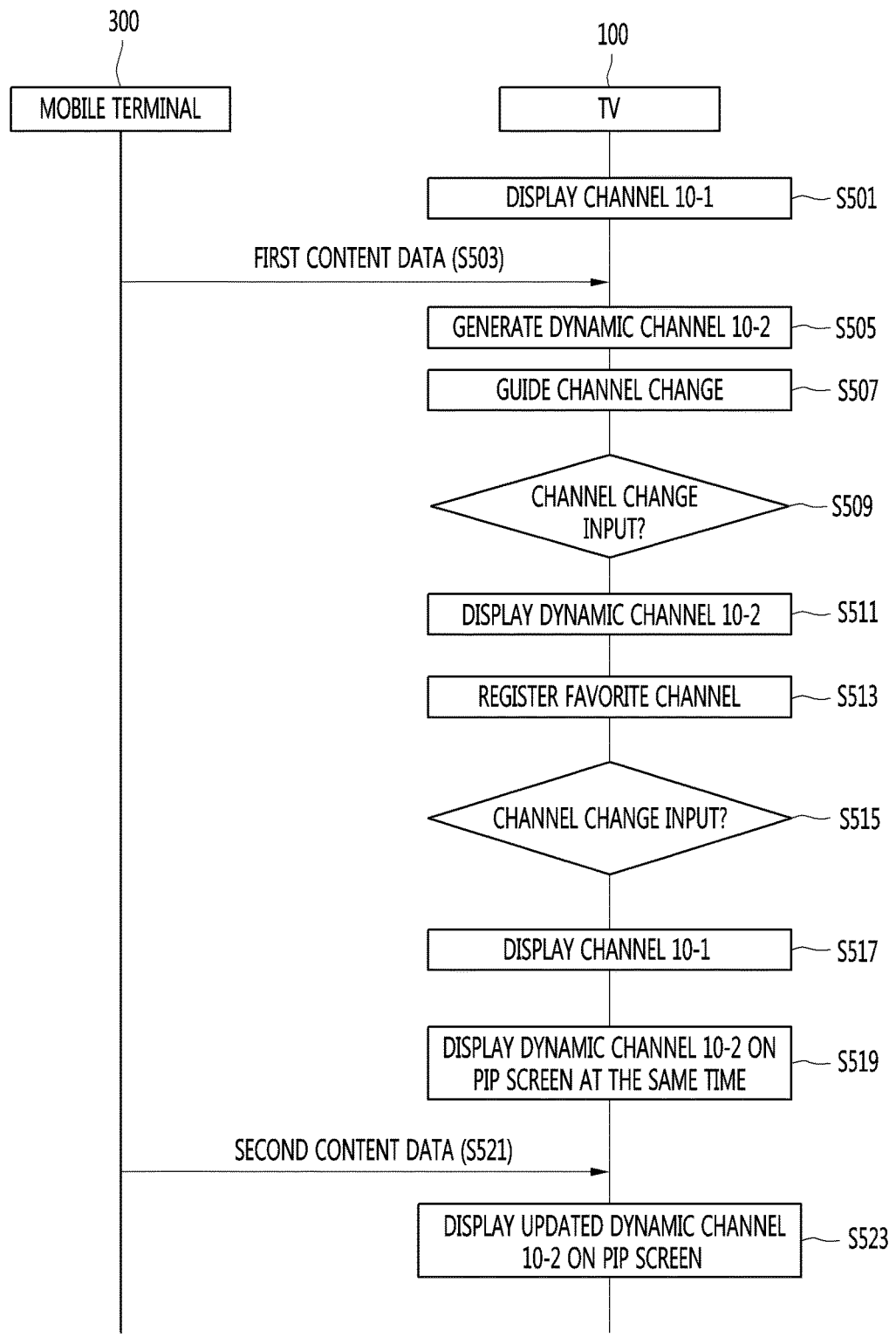
FIG. 5 is a flowchart illustrating a method of generating, entering, and exiting a dynamic channel of a TV according to an embodiment of the present invention.

FIG. 5 is a flowchart illustrating a method of generating, entering, and exiting a dynamic channel of a TV according to an embodiment of the present invention.

Referring to FIG. 5, the TV 100 displays a channel 10-1 in operation S501 and when first content data is transmitted from the mobile terminal 300 in operation S503, generates a dynamic channel 10-2 in operation S505.

That is, a dynamic channel may be formed of a channel where a signal is not allocated among channels that are closest to a channel in current playback, and also may be formed of the next channel or a previous channel of a channel in current playback.

Then, the TV 100 displays a channel change guide in operation S507. Then, referring to FIG. 6, a channel change guide is described in detail.

FIG. 6 is a view illustrating screens when a dynamic channel of a TV is generated, entered, or existed according to an embodiment of the present invention.

Referring to (a) of FIG. 6, when new content data is transmitted during the displaying of a channel 10-1, the TV 100 may display a channel change guide (new picture is sent from Dear OO. If want to check, press channel button) while generating a dynamic channel for the received content data.

The channel change guide (new picture is sent from Dear OO. If want to check, press channel button) may include information on the mobile terminal 300 that transmits the new content data, information on the new content data, and information on dynamic channel entry guide.

The information on dynamic channel entry guide may include information on a user input for checking or canceling the playback of the new content data. The user input for checking the playback of the new content data may be a predetermined button selection input such as a channel button selection input. Alternatively, the user input for canceling the playback of the new content data may be a predetermined button selection input such as a cancel button selection input. The predetermined button may be a button other than a channel button but is not limited thereto.

Alternatively, the information on dynamic channel entry guide may include content that a dynamic channel is entered automatically when a predetermined time elapses from a channel change guide display time point, or content that a dynamic channel entry is canceled automatically when a predetermined time elapses from a channel change guide display time point.

Such a channel change guide may be displayed at a time point that that a program of the current channel is terminated or a time point that a state of the TV 100 that receives content data in a power off state becomes a power on state in addition to a time point that content data is transmitted to the TV 100 in power on state, but the present invention is not limited thereto.

Again, FIG. 5 is described.

Then, when a channel change input is received from a user in operation S509, the TV 100 displays a dynamic channel 10-2 in operation S511.

That is, the channel change input may be a dynamic channel entry command.

The channel change input, for example, may be a predetermined button selection input such as a channel button selection input. At this point, a channel button for dynamic channel entry may be a channel UP button or a channel DOWN button.

Alternatively, when a predetermined time elapses from a channel change guide display time point or a program being displayed on the current channel 10-1 is terminated, the current channel may be changed to a dynamic channel automatically.

Referring to (b) of FIG. 6, the TV 100 may play first content by displaying the dynamic channel 10-2. At this point, while displaying the dynamic channel 10-2, the TV 100 displays an indicator (dynamic channel 10-2 is generated) to provide information on a dynamic channel.

Again, FIG. 5 is described.

The image display device 100 may register the dynamic channel 10-2 as a favorite channel in operation S513.

As registering the dynamic channel 10-2 as a favorite channel according to a user selection, the image display device 100 may provide user's convenience to allow a user to easily access first content at any time.

Although not shown in the drawing, the TV 100, for example, may display an icon corresponding to a dynamic channel on the main screen of a smart TV and register an icon selected according to a user input for selecting the icon as a favorite channel, but the present invention is not limited thereto.

Alternatively, the image display device 100 may automatically register a corresponding dynamic channel 10-2 as a favorite channel at a time point that the dynamic channel 10-2 is displayed according to a channel change input, but is not limited thereto.

Then, when a channel change input is received from a user in operation S515, the TV 100 terminates a dynamic channel screen and displays the changed channel 10-1 in operation S517.

That is, the channel change input during dynamic channel display may be a dynamic channel exit command.

The channel change input, for example, may be a predetermined button selection input such as a channel button selection input. At this point, a channel button for dynamic channel entry may be a channel UP button or a channel DOWN button.

Operation S517 includes again displaying the channel 10-1 displayed previously when a user input for selecting a channel DOWN button is received after the dynamic channel 10-2 is displayed according to a user input for selecting a channel UP button while the channel 10-1 is displayed previously but is not limited thereto.

For example, after the dynamic channel 10-2 is displayed according to a user input for selecting a channel UP button while the previous channel 10-1 is displayed, if a user input for selecting a channel UP button again is received, the next channel 11-1 of a channel displayed previously may be displayed. In such a way, according to an embodiment of the present invention, only with a channel change input, a newly generated dynamic channel may be easily entered or exited.

Alternatively, when the playback of first content is terminated on the dynamic channel 10-2, it may be changed into the previous channel 10-1 automatically.

Alternatively, although not shown in the drawing, playback period expiration according to the above-mentioned playback period information may be a dynamic channel exit command. For example, when content is played for a content playback time or the number of content playbacks according to the playback period information, the TV 100 may terminate a dynamic channel screen and display a channel changed according to a channel change input.

At this point, the TV 100 displays the dynamic channel 10-2 on a PIP screen at the same time in operation S519.

Referring to (c) of FIG. 6, the TV 100 may display the PIP screen at the same time while displaying the previous channel 10-1 and thus continuously display the first content of the dynamic channel 10-2. At this point, while displaying the PIP screen simultaneously, the TV 100 may display an indicator (dynamic channel 10-2 is generated as simultaneous view) to provide information on a dynamic channel.

Although not shown in the drawing, the TV 100 may display a plurality of PIP screens for respectively displaying a plurality of dynamic channels at the same time. Additionally, the TV 100 may adjust whether or not to display a PIP screen, whether or not to maintain a PIP screen, a PIP screen duration time, the size of a PIP screen, and the position of a PIP screen according to a user selection input.

Moreover, when a user's channel selection input is received, the TV 100 may terminate the display of a PIP screen that displays content of a dynamic channel and maintain the display of the PIP screen that displays the content of the dynamic channel despite of a user's channel selection input.

Again, FIG. 5 is described.

Then, when second content data is transmitted from the mobile terminal 300 in operation S521, the image display device 100 displays the updated dynamic channel 10-2 on a PIP screen in operation S523.

The updated channel 10-2 may means the dynamic channel 10-2 that newly plays the second content while playing the first content.

Accordingly, the image display device 100 may display content transmitted from the same terminal through the same dynamic channel and immediately play and display content transmitted in real time through a PIP screen.

However, operation S519 to operation S523 are selective and are not necessarily performed after operation S515 and operation S517.

Moreover, although not shown in the drawings, the TV 100 may perform dynamic channel switching or perform only broadcast channel switching other than dynamic channel according to the reception of a user input for selecting a predetermined button, for example, a jump key.

Figure 7:
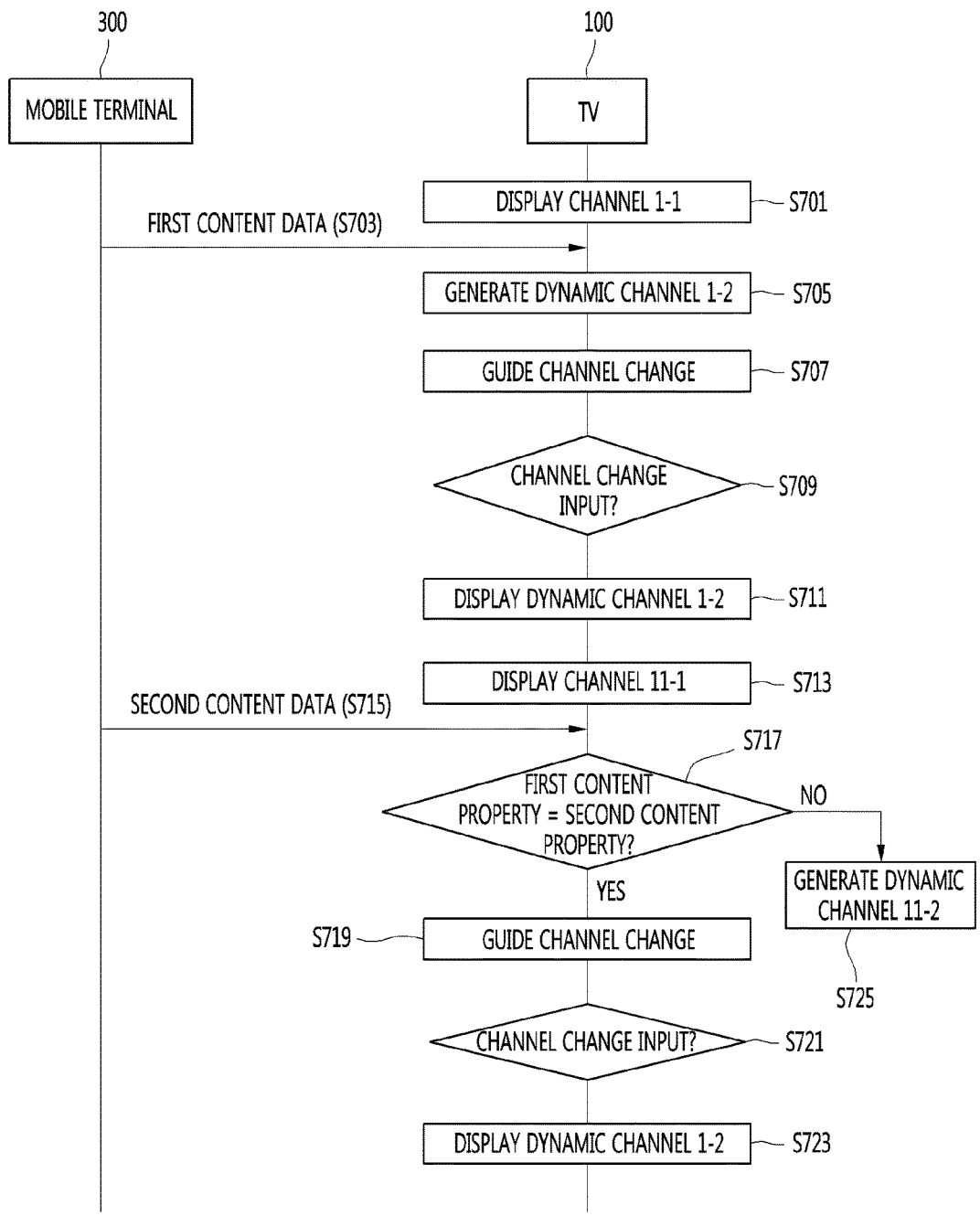
FIG. 7 is a flowchart illustrating a method of re-entering a dynamic channel of a TV according to an embodiment of the present invention.

FIG. 7 is a flowchart illustrating a method of re-entering a dynamic channel of a TV according to an embodiment of the present invention.

Referring to FIG. 7, during the displaying of a channel 1-1 in operation S701, when first content data is transmitted from the mobile terminal 300 in operation S703, the TV 100 generates a dynamic channel 1-2 in operation S705 and displays a channel change guide in operation S707.

Then, when a channel change input is received from a user in operation S709, the TV 100 displays the dynamic channel 1-2 in operation S711.

Then, according to a user selection, the TV 100 displays the channel 11-1 in operation S713 and when second content data is transmitted from the mobile terminal 300 in operation S715, compares a second content property with a first content property in operation S717.

The content property may be included in the content data.

The content property may include content URL, content name, and content transmission terminal IP address but is not limited thereto.

According to a comparison result, if the second content property is identical to the first content property, the TV 100 displays a channel change guide in operation S719.

Then, when a channel change input is received from a user in operation S721, the TV 100 displays the dynamic channel 1-2 in operation S723.

For example, when web service content is transmitted newly, the TV 100 compares URL of web service content played on a previously generated dynamic channel and URL of new web service content and when the URLs are the same, plays the new web service content on the previously generated dynamic channel.

Alternatively, when a new version of application is transmitted, the TV 100 compares the name of a previous version of application played on a previously generated dynamic channel and the name of the new version of application and when the names are the same, plays the new version of application on the previously generated dynamic channel.

Alternatively, when a new episode of TV drama program is transmitted, the TV 100 compares the name of a previous episode of TV drama program played on a previously generated dynamic channel and the name of the new episode of TV drama program and when the names are the same, plays the new episode of TV drama program on the previously generated dynamic channel.

Alternatively, when a new image is transmitted from another device, the TV 100 compares the IP address of a device that transmits an image played on a previously generated dynamic channel and the IP address of a device that transmits a new image and if the IP addresses are the same, plays a new image on the previously generated dynamic channel.

At this point, the channel change input is identical to that described in operation S509.

Moreover, according to a comparison result, if the second content property is different from the first content property, the TV 100 generates a new dynamic channel 11-2 in operation S725.

In such a way, according to an embodiment of the present disclosure, when content having the same property as previously transmitted content is transmitted, since it is unnecessary to allocate a new dynamic channel, a single channel for a plurality of contents having the same property may be formed.

Figure 8:
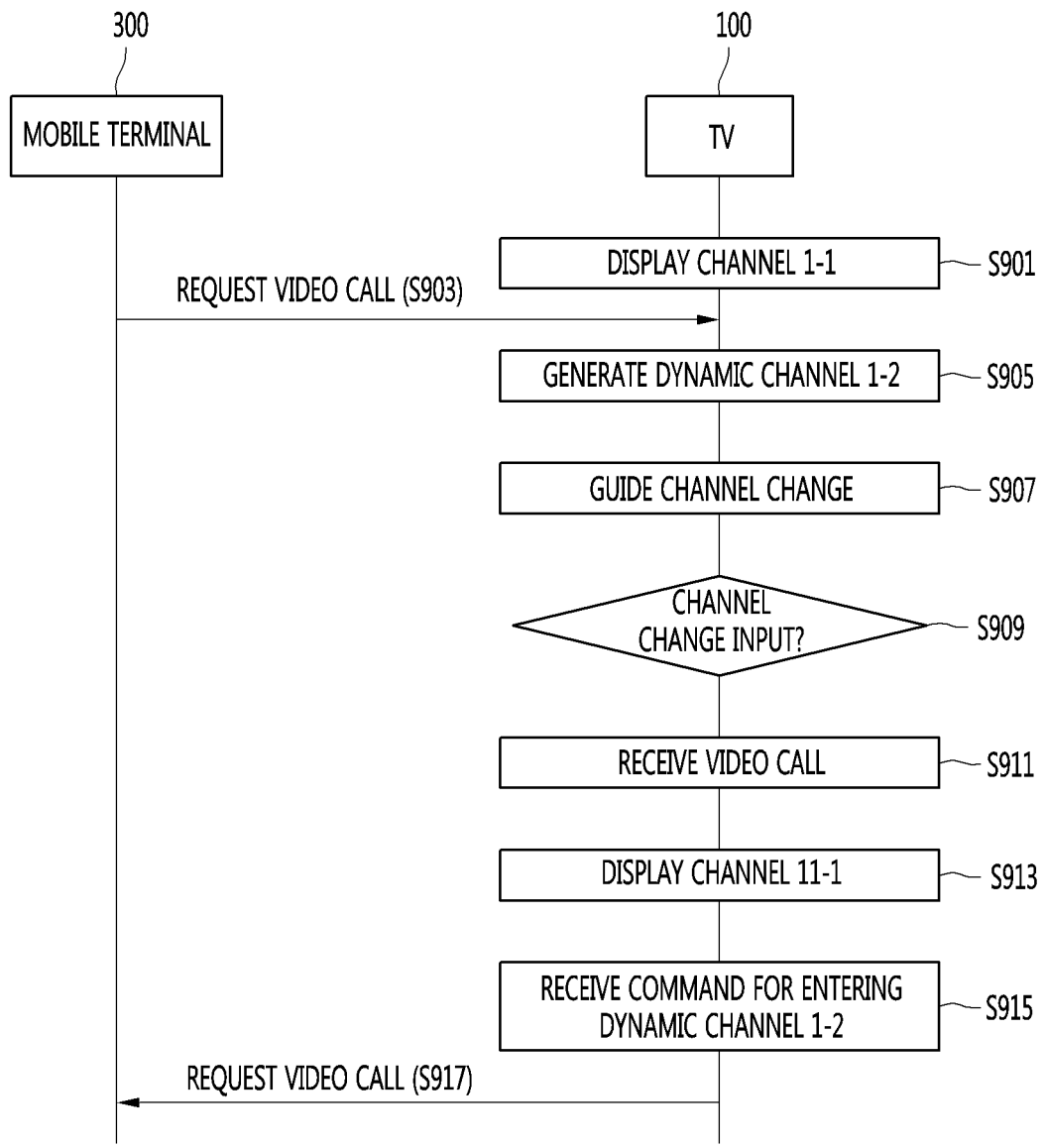
FIG. 8 is a flowchart illustrating a method of using a dynamic channel for a video call of a TV according to an embodiment of the present invention.

FIG. 8 is a flowchart illustrating a method of using a dynamic channel for a video call of a TV according to an embodiment of the present invention.

Referring to FIG. 8, the TV 100 displays a channel 1-1 in operation S901 and when a video call request is transmitted from the mobile terminal 300 in operation S903, generates a dynamic channel 1-2 in operation S905.

That is, even when the video call request is transmitted, the TV 100 may generate a channel where a signal is not allocated among channels that are closest to a channel in current playback as a dynamic channel.

Then, the TV 100 displays a channel change guide in operation S907. Then, referring to FIG. 9, a channel change guide is described in detail.

FIG. 9 is a view illustrating screens when a dynamic channel for a video call of a TV is generated or entered according to an embodiment of the present invention.

Referring to (a) of FIG. 9, when a video call request is transmitted during the displaying of a channel 10-1, the TV 100 may display a channel change guide (video call is requested from Dear OO. If want to receive, press channel button) while generating a dynamic channel for the video call.

The channel change guide (video call is requested from Dear OO. If want to receive, press channel button) may include information on the mobile terminal 300 that transmits the video call request and information on dynamic channel entry guide.

The information on dynamic channel entry guide may include information on a user input for checking or canceling a connection of a video call. The user input for checking the connection of the video call may be a predetermined button selection input such as a channel button selection input. Alternatively, the user input for canceling the connection of the video call may be a predetermined button selection input such as a cancel button selection input.

Alternatively, the information on dynamic channel entry guide may include content that a video call is connected automatically when a predetermined time elapses from a channel change guide display time point, or content that a video call connection is canceled automatically when a predetermined time elapses from a channel change guide display time point.

Again, FIG. 8 is described.

When a channel change input is received from a user in operation S909, the TV 100 receives the requested video call in operation S911.

That is, the channel change input may be a video call reception command.

The channel change input, for example, may be a predetermined button selection input such as a channel button selection input. At this point, a channel button for dynamic channel entry may be a channel UP button or a channel DOWN button.

Alternatively, when a predetermined time elapses from a channel change guide display time point, the current channel may be changed to a dynamic channel automatically.

Referring to (b) of FIG. 9, the TV 100 may perform a video call by displaying the dynamic channel 9-9. At this point, the TV 100 may display an image obtained by capturing a user of the mobile terminal 300 on a PIP screen to provide video call service.

Then, according to a user selection, during the displaying of the channel 11-1 in operation S913, if the entry command to the dynamic channel 1-2 is received in operation S915, the TV 100 requests a video all from the mobile terminal 300 in operation S917.

That is, when a video call with the mobile terminal 300 is transmitted/received through the dynamic channel 1-2, the TV 100 memorizes identification information on the mobile terminal 300 and when entering the dynamic channel 1-2 newly, and requests a video call from the mobile terminal 300.

Hereinafter, referring to FIGS. 10 and 11, a dynamic channel guide screen of a TV is described in detail according to an embodiment of the present invention.

Figures 10, 11:
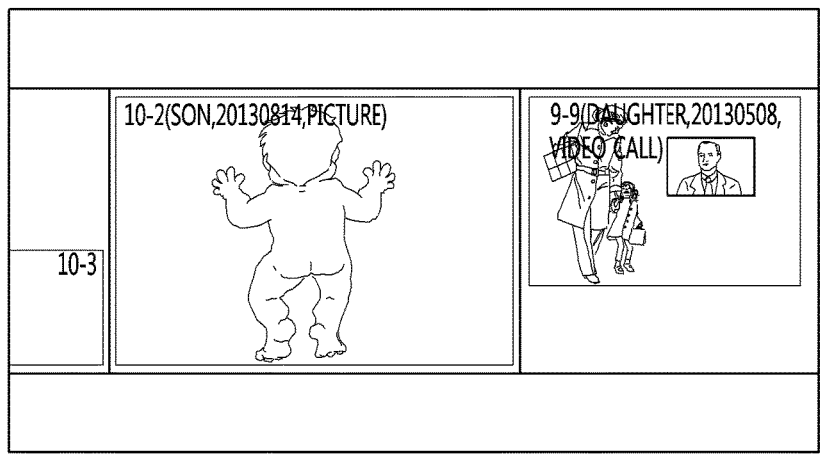
FIG. 10 is a view illustrating a dynamic channel guide screen of a TV according to an embodiment of the present invention.
FIG. 11 is a view illustrating a dynamic channel guide screen of a TV according to an embodiment of the present invention.

FIG. 10 is a view illustrating a dynamic channel guide screen of a TV according to an embodiment of the present invention.

The TV 100 may provide a dynamic channel guide screen shown in FIG. 10. The dynamic channel guide screen shown in FIG. 10 may display only a dynamic channel generated according to a dynamic channel generation command.

Referring to FIG. 10, the TV 100 may display a dynamic channel guide screen on the display unit 180 according to the reception of a user input for selecting a predetermined button, for example, a Hot Key provided at the remote control device 200.

The TV 100 may provide a dynamic channel guide screen according to user log-in information. For example, when user log-in information is different, dynamic channel guide screens provided from the TV 100 may be different.

The dynamic channel guide screen may display at least one dynamic channel information. The dynamic channel information may include information on content playback screen, content upload time, content playback time, sharing device, content, and channel number but is not limited thereto.

The dynamic channel information may be or may not be displayed on the display unit 180 according to a user selection. For example, when a user points to one of a plurality of content playback screens by using a pointer 205 displayed on the display unit 180, dynamic channel information relating to a content playback screen pointed by the pointer 205 may be displayed.

Moreover, at least one dynamic channel information may be listed on the dynamic channel guide screen, for example, in the content upload time order, the content playback time order or the channel number order. At least one dynamic channel information may be listed two-dimensionally or three-dimensionally and may be displayed in various forms such as rectangle and circle but is not limited thereto.

Alternatively, a dynamic channel guide screen may display at least one content playback screen having a different size or position according to a content playback frequency or a content playback order. For example, the most played or most recently played content playback screen may be displayed with the largest size at the center of a dynamic channel guide screen The content playback screen may be a picture or video playback screen and also may be a video call screen. The TV 100 may provide a playback screen of video or a still screen of video, where a stop time point is displayed, by using a progress bar.

Additionally, the TV 100 may filter received content based on an object that a user selects from a picture or video still screen. For example, when a user selects a person A from a content playback screen such as a picture, the TV 100 may select and receive only content including the person A and generate only a dynamic channel for content including the person A.

Alternatively, the TV 100 may filter received content based on an object included in content played more than a predetermined number of times or more than a predetermined time. For example, the TV 100 may select and receive only content including an object B by extracting the object B included in a picture played more than ten times and generate only a dynamic channel for content including the object B.

At least one dynamic channel information displayed on a dynamic channel guide screen may be differently displayed according to whether or not to update it or whether or not to play it. Although not shown in the drawing, for example, the TV 100 may indicate a dynamic channel, which is updated but includes content not played yet, by using an indicator.

Moreover, the TV 100 may display a selected dynamic channel on the display unit 180 according to a user input that selects dynamic channel information displayed on a dynamic channel guide screen. Alternatively, the TV 100 may display a selected dynamic channel on a PIP screen according to a user input that selects dynamic channel information displayed on a dynamic channel guide screen.

FIG. 11 is a view illustrating a dynamic channel guide screen of a TV according to an embodiment of the present invention.

The TV 100 may provide a dynamic channel guide screen shown in FIG. 11. The dynamic channel guide screen shown in FIG. 11 displays a dynamic channel History Map.

Referring to FIG. 11, the TV 100 may display a dynamic channel history map on the display unit 180 according to the reception of a user input for selecting a predetermined button, for example, a Hot Key provided at the remote control device 200.

The TV 100 may provide a dynamic channel history map according to user log-in information. For example, when user log-in information is different, dynamic channel history maps provided from the TV 100 may be different.

The dynamic channel history map may display at least one dynamic channel information. The dynamic channel information may include information on a dynamic channel number, content played on a dynamic channel, a dynamic channel generation time, a dynamic channel holding time, a dynamic channel change time, and a time at which content played on a dynamic channel is updated, but is not limited thereto. At this point, the dynamic channel change time may mean a time at which a corresponding dynamic channel is entered to play content corresponding to a dynamic channel.

The dynamic channel generation time may include a dynamic channel generation date. As shown in FIG. 11, each of 9-9, 10-1, and 11-2 represents a dynamic channel number, and also a video call, a picture, and an APP represent contents played on 9-9, 10-1, and 11-2, respectively.

For example, the dynamic channel history map represents that the dynamic channel 9-9 is created on May 8, 2013 and remains until Dec. 31, 2013. Additionally, the dynamic channel history map includes a record that a corresponding video call is performed on the dynamic channel 9-9 on May 15, 2013 and Aug. 8, 2013.

Additionally, the dynamic channel history map represents that the dynamic channel 10-1 is created on May 15, 2013 and remains until Dec. 10, 2013. Additionally, the dynamic channel history map includes a record that an application where the dynamic channel 10-1 is allocated is updated on Aug. 14, 2013.

Additionally, the dynamic channel history map represents that the dynamic channel 11-2 is created on May 5, 2013 and remains indefinitely. Additionally, the dynamic channel history map includes a record that a new picture is received on the dynamic channel 11-2 on Jul. 25, 2013. The record that a new picture is received, that is, a picture update record, may be a record that a new picture is transmitted from the same device.

Moreover, the dynamic channel history map may identify and display whether updated content is checked. For example, the dynamic channel history map may display a channel that is updated but not checked to be identified by using an OSD or pop-up window that represents a color or an icon. For example, by displaying a circular icon on the channel 11-2 of the dynamic channel history map, the TV 100 may display that an application where the dynamic channel 11-2 is allocated is updated on Jul. 25, 2013 but is not played yet until now.

The TV 100 may change, delete, align, or rearrange a dynamic channel number in the dynamic channel history map according to a user input. Alternatively, the TV 100 may change or delete a dynamic channel holding time displayed on the dynamic channel history map according to a user input.

Figure 12:
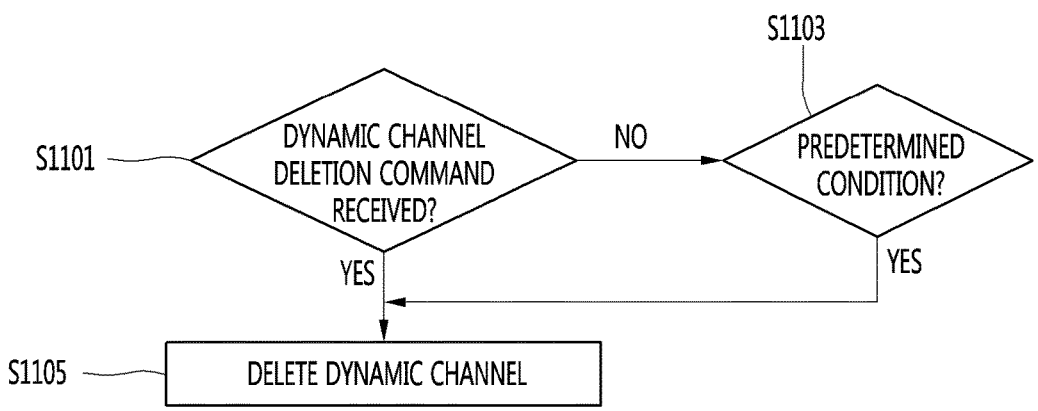
FIG. 12 is a flowchart illustrating a method of deleting a dynamic channel of a TV according to an embodiment of the present invention.

Then, referring to FIG. 12, the dynamic channel deletion of a TV is described in detail according to an embodiment of the present invention.

FIG. 12 is a flowchart illustrating a method of deleting a dynamic channel of a TV according to an embodiment of the present invention.

Referring to FIG. 12, when receiving a dynamic channel deletion command in operation S1101, the TV 100 deletes the dynamic channel in operation S1105.

The dynamic channel deletion command may be a dynamic channel deletion input on a dynamic channel display screen or a dynamic channel deletion input on the above-mentioned dynamic channel guide screen, but is not limited thereto.

Alternatively, even if a dynamic channel deletion command is not received, when a predetermined condition is satisfied in operation S1103, the TV 100 deletes the dynamic channel in operation S1105.

The predetermined condition for dynamic channel deletion may mean a case that the above-described predetermined content playback time is expired, a case that content playback is completed a predetermined number of content playback, or a case that the TV 100 becomes a power off state.

After the dynamic channel is deleted by the dynamic channel deletion command, a new dynamic channel may be generated on a corresponding channel.

Additionally, when content having the same property as the content played on the deleted dynamic channel is transmitted, a new dynamic channel for playing the newly transmitted content may be generated.

Figure 13:
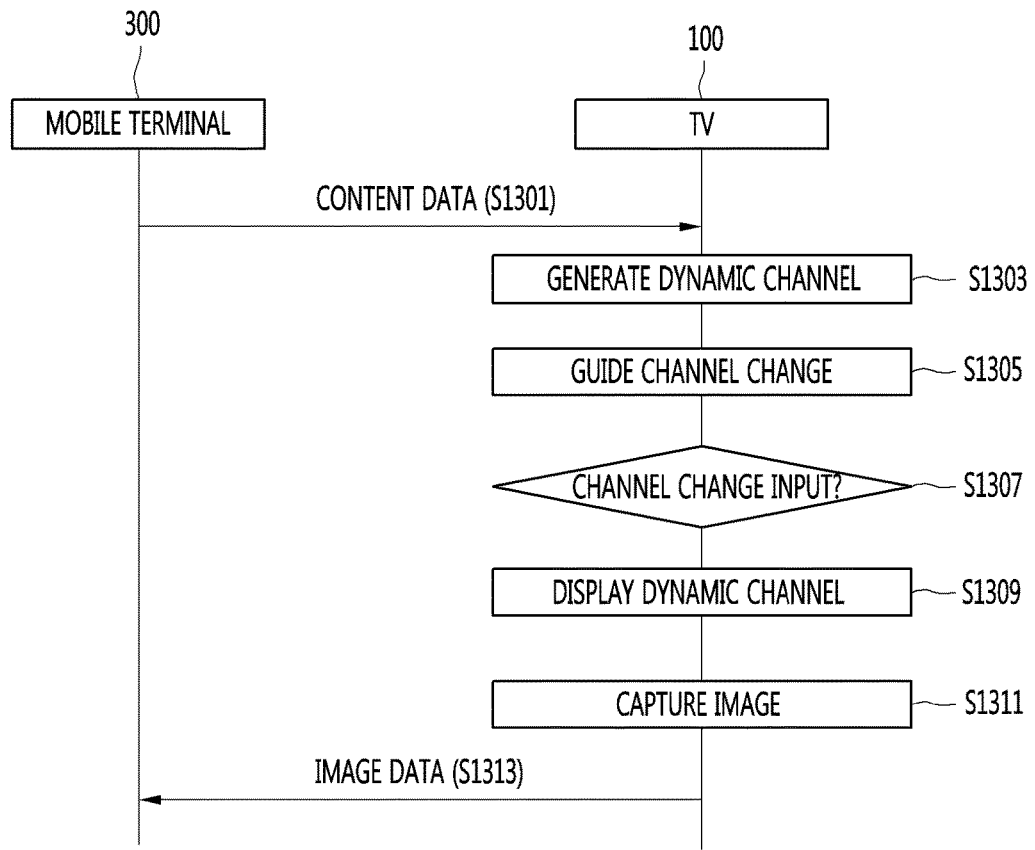
FIG. 13 is a view illustrating a method of transmitting feedback data by using a dynamic channel of a TV according to an embodiment of the present invention.

Then, referring to FIG. 13, feedback data transmission using a dynamic channel of a TV is described in detail according to an embodiment of the present invention.

FIG. 13 is a view illustrating a method of transmitting feedback data by using a dynamic channel of a TV according to an embodiment of the present invention.

Referring to FIG. 13, when receiving content data transmitted from the mobile terminal 300 in operation S1301, the TV 100 generates a dynamic channel in operation S1303, and displays a channel change guide in operation S1305.

Then, when a channel change input is received in operation S1307, the TV 100 displays a dynamic channel in operation S1309 and captures an image in operation S1311. That is, while playing content by displaying a dynamic channel, the TV 100 captures an image of a user who watches a content playback screen to generate feedback data for corresponding content.

At this point, the TV 100 may generate feedback data for corresponding content selectively according to the type of content played on a dynamic channel. For example, the TV 100 may perform image capturing only if a picture or a video is played on a dynamic channel.

The image capturing may include picture capturing, video capturing, and voice recording.

The TV 100 may use a camera connected to the external device interface unit 135 or a built-in camera in order for image capturing. The TV 100 may activate a camera automatically when entering a dynamic channel or in the case of a built-in camera, it may protrude toward the outside of the TV 100.

The TV 100 may use a microphone connected to the external device interface unit 135 or use a built-in camera in order for image capturing. The TV 100 may activate a microphone automatically when entering a dynamic channel.

Then, the TV 100 transmits image data to the mobile terminal 300 in operation S1313. At this point, the TV 100 may transmit a message such as Multimedia Messaging Service (MMS) including a captured image to the mobile terminal 300.

As a result, a user of the mobile terminal 300 may check whether the content of the TV 100 is received and a reaction to the content of a user of the TV 100.

Figure 14:
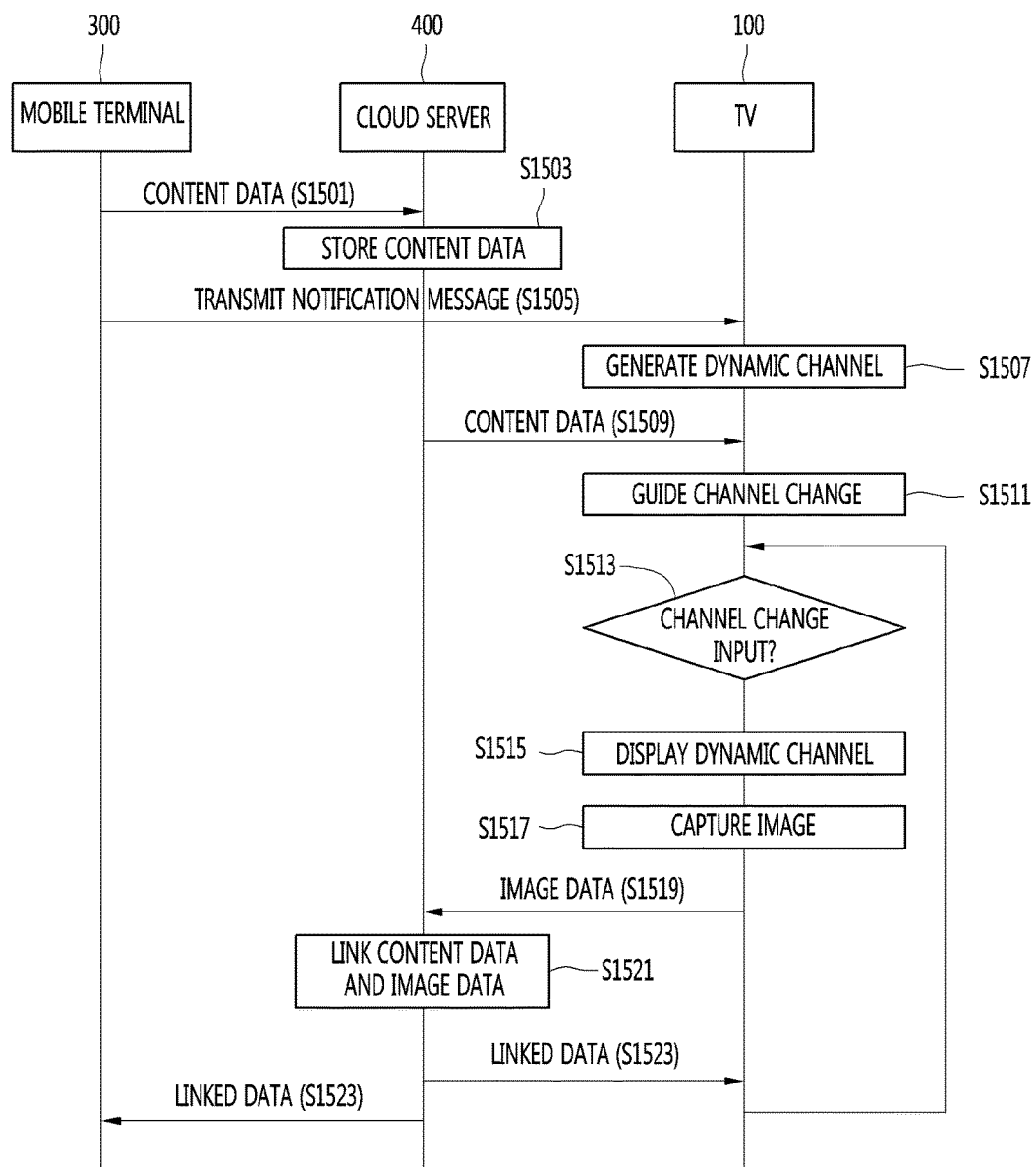
FIG. 14 is a view illustrating a method of transmitting feedback data by using a dynamic channel of a TV according to an embodiment of the present invention.

FIG. 14 is a view illustrating a method of transmitting feedback data by using a dynamic channel of a TV according to an embodiment of the present invention.

Referring to FIG. 14, the mobile terminal 300 uploads content data to the cloud server 400 in operation S1501.

At this point, the mobile terminal 300 may upload content to a first storage area among a plurality of storage areas included in the cloud server 400.

Then, the cloud server 400 stores the updated content data in operation S1503.

At this point, the cloud server 400 stores the content data uploaded to the first storage area.

The mobile terminal 300 transmits a notification message to the TV 100 in operation S1505 while uploading content data to the cloud server 400. The notification message may include information on URL of the cloud server 400 and the first storage area of the cloud server 400.

Then, when the TV 100, which receives a notification message, generates a dynamic channel in operation S1507, the cloud server 400 transmits uploaded content data to the TV 100 in operation S1509.

Then, the TV 100 displays a channel change guide in operation S1511.

When a channel change input is received from a user in operation S1513, the TV 100 captures an image in operation S1517 while displaying a dynamic channel in operation S1515.

The image capturing may include picture capturing, video capturing, and voice recording.

When content played on a dynamic channel is a plurality of pictures, the TV 100 may capture each image of a user who watches each of a plurality of pictures.

Alternatively, the TV 100 may capture only an image of a user who watches a picture selected according to a user input among a plurality of pictures.

Alternatively, when content played on a dynamic channel is a video, the TV 100 may capture each image of a user who watches the video at a predetermined interval or at a predetermined time point.

Alternatively, the TV 100 may capture an image of a user who watches a video only at a time point selected according to a user input.

Then, the TV 100 transmits image data to the mobile terminal 300 in operation S1519. At this point, the TV 100 may transmit image data to a first storage area among a plurality of storage areas included in the cloud server 400.

Then, the cloud server 400 links and stores content data transmitted from the mobile terminal 300 and image data transmitted from the TV 100 in operation S1521.

At this point, the cloud server 400 stores content data and image data in the first storage area.

For example, when content includes a plurality of pictures, the cloud server 400 may link and store a user image for each of the plurality of pictures.

Alternatively, when content includes a video, the cloud server 400 may link and store a user image for a predetermined time point of the video. At this point, a user image for video may include a plurality of user images and the plurality of user images may be linked and stored at a predetermined interval.

Then, each of the mobile terminal 300 and the TV 100 receives linked data stored in the cloud server 400 in operation S1523. That is, each of the mobile terminal 300 and the TV 100 may share content stored in the first storage area of the cloud server 400.

Through such a method, reactions of sharing device users for content may be shared also. For example, a user of the mobile terminal 300 may check the satisfaction of a sharing device user for content by using linked data and selectively check the satisfaction of a sharing device user for a specific picture among a plurality of pictures or a specific time point of a video.

Although not shown in the drawing, feedback data transmitted from the TV 100 to the mobile terminal 300 or the cloud server 400 may include information on whether content is played on the TV 100, a content playback time, and the number of content playback in addition to image data.

Moreover, when receiving a channel change input for entering a previously generated dynamic channel in operation S1513, the TV 100 displays a dynamic channel in operation S1515 and plays contents and images corresponding to linked data to check a feedback for content.

Figure 15:
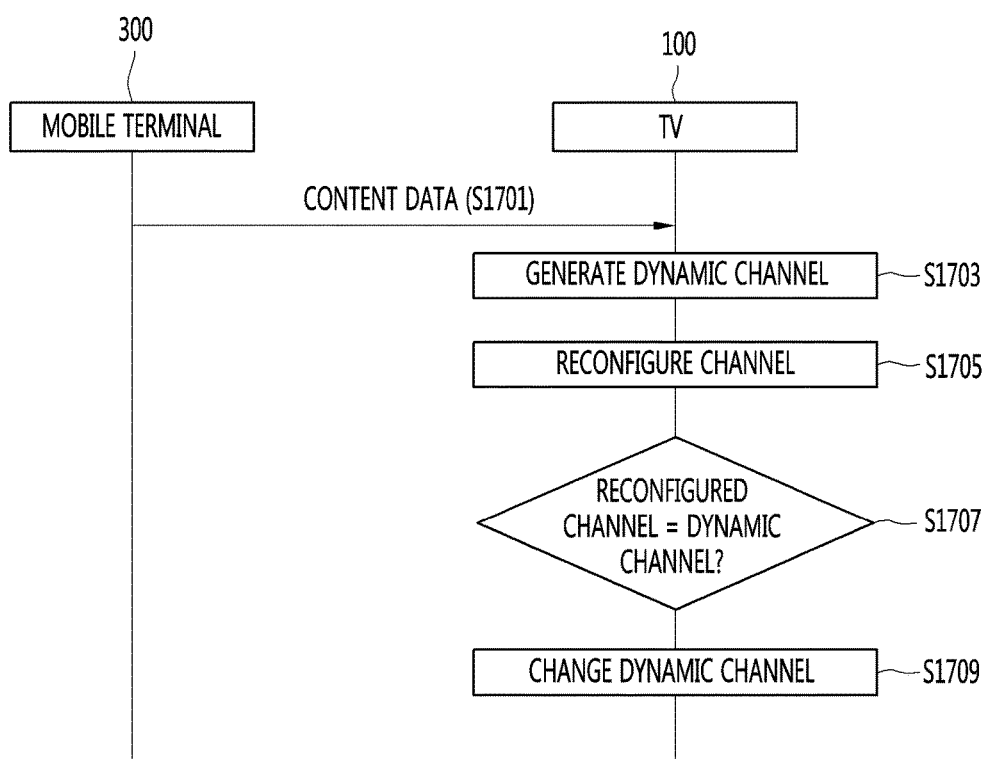
FIG. 15 is a view illustrating a method of changing a dynamic channel of a TV according to an embodiment of the present invention.

Referring to FIG. 15, the dynamic channel change of a TV is described in detail according to an embodiment of the present invention.

FIG. 15 is a view illustrating a method of changing a dynamic channel of a TV according to an embodiment of the present invention.

Referring to FIG. 15, when receiving content data transmitted from the mobile terminal 300 in operation S1701, the TV 100 generates a dynamic channel in operation S1703.

For example, when receiving content data during the displaying of a broadcast channel 20-1, the TV 100 may generate a channel 20-2 where a signal is not allocated as a dynamic channel.

Alternatively, when receiving content data during the displaying of a signal on a channel 21, which is received through an accessed set-top box, the TV 100 may generate a channel 22 where a signal is not allocated as a dynamic channel.

Then, when a channel is reconfigured in operation S1705, the TV 100 determines whether the reconfigured channel is identical to the generated dynamic channel in operation S1707.

A case that a channel is reconfigured, for example, may be a case that Auto Channel Scan such as handover is executed.

For example, based on an auto channel scan result, the channel 20-2 may be allocated as a broadcast channel.

Alternatively, a case that a channel is reconfigured, for example, may be a case that EPG update is executed.

For example, based on an EPG update result, the channel 22 may be allocated as a channel for outputting a signal received through a set-top box.

When the reconfigured channel and the generated dynamic channel are the same, the TV 100 changes the dynamic channel in operation S1709.

For example, when the broadcast channel 20-2 exists based on the channel reconfiguration result, the TV 100 may change the previously generated dynamic channel 20-2 into 20-3.

Alternatively, when outputting a signal received through a set-top box on the channel 22 based on the channel reconfiguration result, the TV 100 may change the previously generated dynamic channel 22 into 23.

At this point, the TV 100 may change a channel where a signal is not allocated among channels that are closest to a channel allocated during dynamic channel generation into a dynamic channel. When the dynamic channel is changed, the above-described dynamic channel guide screen may display the changed dynamic channel.

A TV operating method according to the present invention may be implemented as a program to be executed on a computer and stored in a computer readable recording medium, and examples of the computer readable recording medium may include ROM, RAM, CD-ROM, magnetic tape, floppy disk, and optical data storage device and also may be implemented in a form of carrier waves (for example, transmission through the Internet).

The computer readable recording medium can also be distributed over network coupled computer systems so that the computer readable code is stored and executed in a distributed fashion. Also, functional programs, codes, and code segments for implementing a TV operating method according to the present invention can be easily inferred by programmers skilled in the art.

Additionally, although various embodiments of the present invention have been particularly shown and described, the present invention is not limited to the above-mentioned specific embodiments and it should be understood by those skilled in the art that various modified embodiments are possible without departing from the technical idea and outlook of the present invention.

The invention claimed is:

1. An operating method of a television (TV) for allocating a dynamic channel for content transmitted from outside the TV, the method comprising:
   receiving a first content from the outside;
   generating a dynamic channel for the first content;
   displaying a channel change guide according to the first content reception;
   entering the dynamic channel according to a first channel change input;
   displaying a playback screen of the first content according to the dynamic channel entry; and
   exiting from the dynamic channel according to a second channel change input,
   wherein generating the dynamic channel includes:
      when the TV is in a power on state, allocating a channel where a signal is not allocated among channels that are closest to a broadcast channel in display currently as the dynamic channel; and
      when the TV is in a power off state, allocating a channel where a signal is not allocated among channels that are closest to a broadcast channel displayed at a power off time point as the dynamic channel.

2. The method of claim 1, further comprising:
   receiving a second content from the outside;
   when a property of the second content is identical to a property of the first content, determining the dynamic channel as a dynamic channel for the second content;
   displaying a channel change guide according to the second content reception;
   entering the dynamic channel according to a third channel change input; and
   displaying a playback screen of the second content according to the dynamic channel entry.

3. The method of claim 2, further comprising, when the property of the second content is different from the property of the first content, generating a new dynamic channel for the second content.

4. The method of claim 2, wherein the property corresponds to at least one of a content Uniform Resource Locator (URL), a content name, and an IP address of the terminal.

5. The method of claim 4, wherein the determining of the dynamic channel as the dynamic channel for the second content comprises, even when at least one of an episode or a version of the second content is different from an episode or a version of the first content, when the property of the second content is identical to the property of the first content, determining the dynamic channel as a dynamic channel for the second content.

6. The method of claim 1, wherein the exiting from the dynamic channel comprises displaying a broadcast program corresponding to a broadcast channel changed according to the second channel change input on an entire screen and displaying a playback screen of the first content corresponding to the dynamic channel on a portion of the screen.

7. The method of claim 6, further comprising:
receiving a third content;
when a property of the third content is identical to a property of the first content, determining the dynamic channel as a dynamic channel for the third content; and
displaying a playback screen of the third content on the portion of the screen,
wherein the property corresponds to at least one of a content URL, a content name, and an IP address of the terminal.

8. The method of claim 1, further comprising displaying a dynamic channel history map for displaying dynamic channel information,
wherein the dynamic channel information comprises at least one of dynamic channel number information, information on content played on a dynamic channel, dynamic channel generation time information, a dynamic channel holding time information, dynamic channel change time information, and update time information of content played on a dynamic channel.

9. The method of claim 8, wherein information on content whose dynamic channel history map is updated or which is not played is displayed using at least one of an indicator or a pop-up window.

10. The method of claim 8, further comprising changing or deleting the dynamic channel information displayed on the dynamic channel history map, according to a user input.

11. The method of claim 8, further comprising:
when a plurality of dynamic channel information is displayed in the dynamic channel history map, aligning or rearranging the plurality of dynamic channel information.

12. The method of claim 1, further comprising:
reconfiguring a channel; and
when a reconfigured channel is identical to the dynamic channel, changing the dynamic channel.

13. The method of claim 12, wherein the reconfiguring of the channel comprises executing Auto Channel Scan.

14. The method of claim 12, wherein the reconfiguring of the channel comprises updating Electronic Program Guide (EPG) for a signal transmitted from a set-top box.

15. The method of claim 12, wherein the changing of the dynamic channel comprises allocating the changed dynamic channel to a channel where a signal is not allocated among channels that are closest to the generated dynamic channel.

16. An operating method of a television (TV) for allocating a dynamic channel for content transmitted from a server, the method comprising:
receiving a notification message for notifying that a first content is uploaded to the server;
generating a dynamic channel for the first content;
receiving the first content from the server;
displaying a channel change guide according to the first content reception;
entering the dynamic channel according to a first channel change input;
displaying a playback screen of the first content according to the dynamic channel entry;
exiting from the dynamic channel according to a second channel change input;
receiving a notification message for notifying that a second content is uploaded to the server;
when a property of the second content is identical to a property of the first content, determining the dynamic channel as a dynamic channel for the second content;
receiving the second content from the server;
displaying a channel change guide according to the second content reception;
entering the dynamic channel according to a third channel change input; and
displaying a playback screen of the second content according to the dynamic channel entry,
wherein generating the dynamic channel includes:
when the TV is in a power on state, allocating a channel where a signal is not allocated among channels that are closest to a broadcast channel in display currently as the dynamic channel; and
when the TV is in a power off state, allocating a channel where a signal is not allocated among channels that are closest to a broadcast channel displayed at a power off time point as the dynamic channel.

17. The method of claim 16, further comprising, when the property of the second content is different from the property of the first content, generating a new dynamic channel for the second content.

18. The method of claim 16, wherein the property corresponds to at least one of a content URL, a content name, and an IP address of a terminal that uploads content to the server.

19. The method of claim 16, wherein the notification message comprises a URL address of the server.

20. A television (TV) for allocating a dynamic channel for content transmitted from outside the TV, the TV comprising:
an audio output unit;
a display unit;
a user interface unit configured to receive a user input for channel change;
a tuner configured to receive a broadcast signal corresponding to a broadcast channel selected according to a user input;
a demodulation unit configured to demodulate a broadcast signal received through the tuner and decode the broadcast channel to output a stream signal;
a network interface unit configured to receive a first content from the outside; and
a control unit configured to de-multiplex the stream signal into an audio signal and a video signal, signal-process the audio signal and then output the processed audio signal through the audio output unit, process the video signal and then output the processed video signal through the display unit, generate a dynamic channel for the first content, control the display unit to display a playback screen of the first content by changing the broadcast channel into the dynamic channel according to a first channel change input, and control the display unit to display a playback screen of a broadcast program corresponding to a broadcast channel changed from the dynamic channel according to a second channel change input, wherein, when the TV is in a power on state, the control unit allocates a channel where a signal is not allocated among channels that are closest to the broadcast channel in display currently as the dynamic channel, and wherein, when the TV is in a power off state, the control unit allocates a channel where a signal is not allocated among channels that are closest to a broadcast channel displayed at a power off time point as the dynamic channel.

21. The TV of claim 20, wherein
the network interface unit receives a second content from the outside; and
when a property of the second content is identical to a property of the first content, the control unit determines the dynamic channel as a dynamic channel for the second content and controls the display unit to enter the dynamic channel according to a third channel change input to display a playback screen of the second content, and when the property of the second content is different from the property of the first content, generates a new dynamic channel for the second content.

22. The TV of claim 21, wherein the property corresponds to at least one of a content URL, a content name, and an IP address of a terminal that uploads content to the server.

23. The TV of claim 20, wherein the control unit controls the display unit to display a playback screen of the first content corresponding to the dynamic channel on a portion of the screen while displaying a broadcast program corresponding to a broadcast channel changed according to the second channel change input on an entire screen;
when a third content is received from the outside through the network interface unit, if a property of the third content is identical to a property of the first content, the control unit determines the dynamic channel as a dynamic channel for the third content and controls the display unit to display a playback screen of the third content on the portion of the screen; and
the property corresponds to at least one of a content URL, a content name, and an IP address of a terminal that uploads content to the server.

24. The TV of claim 20, wherein the display unit displays a dynamic channel history map for displaying dynamic channel information, and the dynamic channel information comprises at least one of dynamic channel number information, information on content played on a dynamic channel, dynamic channel generation time information, dynamic channel holding time information, dynamic channel change time information, and update time information of content played on a dynamic channel; and
when a user input for changing or deleting the dynamic channel information displayed on the dynamic channel history map is received through the user interface unit, the control unit changes or deletes the dynamic channel according to the user input.

25. The TV of claim 20, wherein when auto channel scan is executed or EPG for a signal transmitted from a set-top box is updated, the control unit reconfigures a broadcast channel, and when the reconfigured broadcast channel is identical to the dynamic channel, changes the dynamic channel into a channel where a signal is not allocated among channels that are closest to the dynamic channel.

\* \* \* \* \*